United States Patent [19]

Carino

[11] 3,986,083
[45] *Oct. 12, 1976

[54] CAPACITOR CASE COVER DISC SEAL AND VENTING MEANS

[75] Inventor: John William Carino, Columbia, S.C.

[73] Assignee: General Electric Company, Hudson Falls, N.Y.

[*] Notice: The portion of the term of this patent subsequent to Sept. 9, 1992, has been disclaimed.

[22] Filed: July 7, 1975

[21] Appl. No.: 593,743

Related U.S. Application Data

[63] Continuation-in-part of Ser. No. 441,052, Feb. 11, 1974, Pat. No. 3,904,939.

[52] U.S. Cl. ............................ 317/230; 174/52 S; 317/242; 29/570; 220/208
[51] Int. Cl.² ........................ H01G 9/00; H01G 9/16; B65D 51/16; B01J 17/00
[58] Field of Search .......... 174/52 S; 317/230, 242; 220/44 R; 29/570

[56] References Cited
UNITED STATES PATENTS

| 2,881,368 | 4/1959 | Hancock | 317/230 |
| 3,197,547 | 7/1965 | Peace et al. | 317/230 |
| 3,429,980 | 2/1969 | Guttmann | 174/52 S |
| 3,904,939 | 9/1975 | Carino | 317/230 |

*Primary Examiner*—Andrew J. James

[57] ABSTRACT

An electrolytic capacitor comprising an open ended casing, said casing having an inner wall with means defining a tapered surface channel; and a resilient seal member compressibly supported by the tapered surface in the channel to form a hermetic seal for the open end of the casing. Venting means can be provided by forming the channel with a gradually varying depth such that excess gas pressure can be vented by causing the seal to be tipped out of the channel at the shallowest point of the channel.

4 Claims, 4 Drawing Figures

CAPACITOR CASE COVER DISC SEAL AND VENTING MEANS

BACKGROUND OF THE INVENTION

This invention is a continuation in part of copending application Ser. No. 441,052, Carino, filed Feb. 11, 1974 and assigned to the same assignee as the present invention and now U.S. Pat. No. 3,904,939.

This invention relates to seal constructions and more particularly to a seal construction for fluid-containing electrical devices such as electrolytic capacitors.

Heretofore some electrolytic capacitor hermetic seals have been held in the open end juxtaposed against an annular shoulder formed in the inner wall of an open end of an insulative cylindrical casing by a cylindrical, metal, outer retaining ring. The ring is flexed inwardly of the casing to apply, by wedging action, force to the outer face of a disc-shaped seal, thereby to bias the seal inwardly against an annular shoulder. However, certain capacitor designs do not allow the use of the conductive metal ring due to application requirements.

In order to seal capacitors for these applications, it has been necessary to (1) cement the inner face of the seal to the annular shoulder as a means for temporarily fixing the seal in place for subsequent application and curing of an epoxy fillet; (2) install a metal retaining ring against the outer face of the seal until the cement is ultimately cured; (3) remove the metal ring; and (4) manually introduce a sealing fillet of epoxy around the outer perimeter of the seal adjacent and in contact with the inner casing wall to provide a permanent seal therebetween.

Another variant on the foregoing method is to provide a plurality of splines which are molded to the inner wall of the casing in a perpendicular relationship to the annular shoulder. The seal upon insertion, will be wedged in place with the cylindrical wall of the disc-shaped seal engaging the splines and outer perimeter of the inner face of the seal contacting the annular shoulder. The epoxy fillet is then applied and cured as in (4) above to complete the seal.

Accordingly, it is an object of this invention to provide an improved seal construction for electrical devices such as electrolytic capacitors which can be simply sealed in an economical one step operation.

It is another object of this invention to provide a simple and effective venting mechanism which can be provided for in the design of the molded casing inner wall. Other objects of this invention will be apparent from the following description and accompanying claims.

SUMMARY OF THE INVENTION

In accordance with the aforementioned objects, one embodiment of this invention is an electrolytic capacitor comprising an open ended, molded thermoplastic casing, the inner wall of which has means formed thereon defining a taper surfaced channel; and a resilient seal hermetically compressibly supported in said channel.

Another embodiment of this invention provides an electrolytic capacitor differing from said one embodiment in that the channel has a gradually varying depth, thereby allowing the seal to vent at the shallowest point of the channel.

This invention will be better understood by reference to the following description taken in conjunction with the accompanying drawings.

DESCRIPTION OF THE PREFERRED EMBODIMENTS

Figure 1:
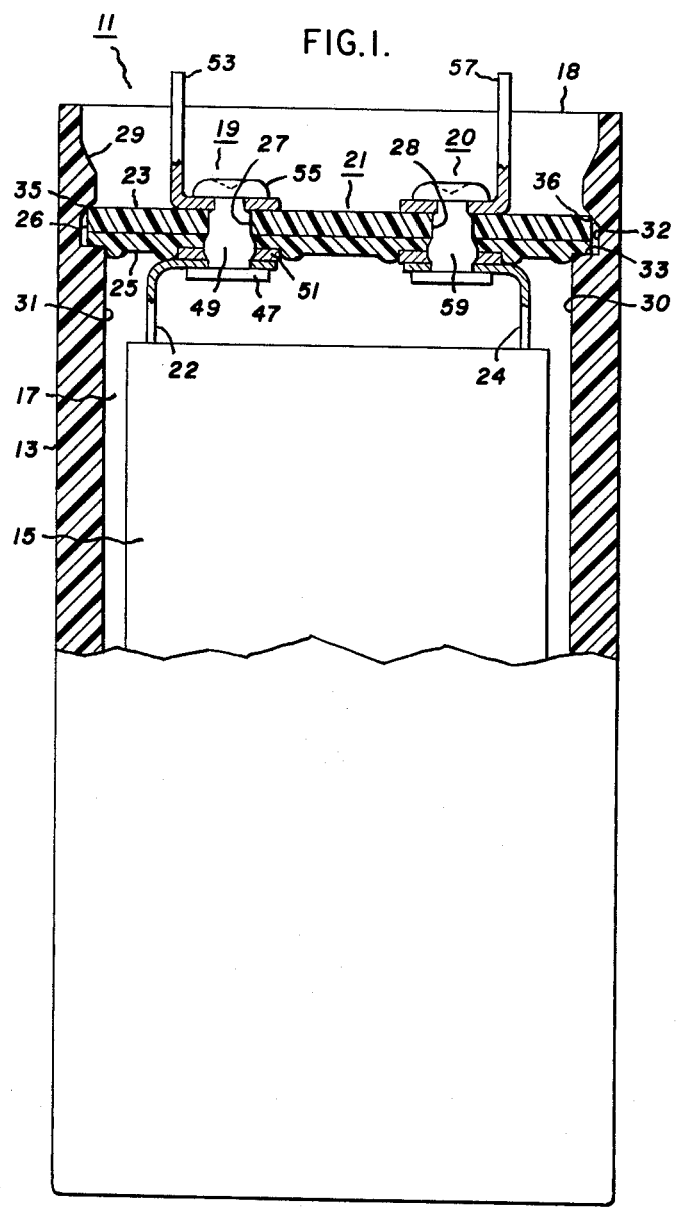
FIG. 1 is an axial section of one embodiment of an electrolytic capacitor in accordance with this invention.

Referring now to FIG. 1, an electrolytic capacitor 11 is shown comprising a cup-shaped, phenolic thermoset plastic casing 13 containing a rolled capacitor section 15 conventionally made up of a pair of convolutely wound electrode foils (not shown) of film forming metal such as aluminum or other capacitor electrode metals well known in the art. The foils are separated by paper or other dielectric spacer material (not shown). Capacitor section 15, when disposed in the casing 13, is impregnated with a liquid electrolyte which may be of any conventional or known type of capacitor electrolyte as, for example, an aqueous ammonium pentaborate-glycol solution or a non-aqueous organic liquid composition or mixture. The electrolyte may be of a liquid, gel, paste, or other form. Typically, the capacitor section 15 is impregnated with electrolyte prior to insertion into the casing 13. However, some applications utilize an excess of electrolyte in the casing.

Preferably, the casing 13 is cup-shaped with one open end, as in FIG. 1, which is hermetically sealed by a seal assembly constructed in accordance with the invention. It should be understood that the seal structures described hereinbelow could be employed in types of capacitors other than those shown. For example, the casing 13 could be open at both ends and have one or both ends hermetically sealed in accordance with the invention herein. As has been stated, in accordance with the preferred embodiment, the casing is preferably constructed of a molded phenolic thermoset plastic. However, as will be apparent to those skilled in the art, other thermoset or thermoplastic materials may be substituted therefor.

A disc seal 21 is provided to hermetically seal the open end 18 of the cup-shaped casing 13. In sealing the open end 18, the two areas of special concern are, of course, the area around terminal assemblies 19, 20 and the interface between the inner wall 31 and the cylindrical side wall 26 of the disc seal 21; the improvement of the seal of the latter, fully described hereinbelow, being the primary object of the invention herein. The terminal assembly 19 comprises a rivet 47 having a rivet shank 49 inserted through opening 27, a tab 22 connected at one end to capacitor section 15 and at the other end mounted over rivet shank 49, a washer 51 mounted on rivet shank 49 adjacent the tab 22, and a first terminal 53 mounted between the seal 21 and a flattened end 55 of rivet shank 49. Terminal assembly 20 is constructed in an analogous manner to that of assembly 19 to provide electrical connection of the capacitor section 15 to a second terminal 57 via a tab 24 and a rivet 59. It will be understood by those skilled in the art that other terminal constructions will also provide satisfactory operation.

The disc seal 21 is preferably of an electrically non-conductive material and usually comprises a laminated assembly of different materials. For example, disc seal 21 includes an outer cover member 23 of a relatively rigid material such as a paper base or phenolic resin and an inner layer 25 of a suitable easily compressible elastomeric cold flow-resistant material such as Neoprene and Buna N rubber.

Also, suitable normally sealed venting means (not shown) may be provided in the disc seal 21 which will burst or vent upon the development of a predetermined amount of pressure within the capacitor. The venting means may comprise a centrally located cylindrical recess in the disc seal 21 formed by a conventional means such as by cutting out a plug portion of the layer 23, thereby to leave only a predetermined thickness of the inner layer 25. This thickness is thus dimensioned to vent by rupturing at the predetermined pressure.

The disc seal 21 is hermetically supported on the inner in a channel 32 defined between a radially inwardly projecting annular rib 29 and an annular shoulder 33 formed in the inner wall 30. The thickness or width of the channel 32 is chosen relative to the thickness of the disc seal 21 so as to provide approximately a 30 percent compression of the resilient layer 25 when the seal is positioned between the rib 29 and shoulder 33. Because diameter of the disc seal 21 is less than the diameter of the channel 32, the compressional forces on the disc seal 21 are applied between a plurality of points 35, spaced from the bottom wall of channel 32 on the inner side of rib 29 and the shoulder 33. In a typical capacitor casing construction and as an example, the approximate dimensions would be 1,869 mils diameter of the disc seal 21; 100 mils total uncompressed thickness of seal 21; 27 mils non-compressed thickness of elastomeric layer 25; 19 mils compressed thickness of layer 25; 73 mils thickness for layer 23; 1,875 mils diameter of channel 32; and 80 mils width of channel 32 measured between the shoulder 33 and the points of contact 35 of the disc seal 21 on the inner side of disc seal 21.

It will be apparent to those skilled in the art that the degree of compression can be varied in accordance with the sealing requirements of the particular application and with the characteristics of the material selected for layer 25.

In the sealing operation, the disc seal 21 is inserted in the opening 18 so as to bring the resilient layer 25 into engagement with the shoulder 33. Sufficient force is applied to the disc seal 21 to flex and push it past the rib 29 to allow the outer edge of layer 23 to catch beneath the innermost side of the rib 29. After passing the peak of rib 29, the seal will spring back in an essentially planar configuration. The disc seal 21, being smaller in diameter than the diameter of channel 32, will tend to center itself within the channel with approximately equal compressive forces being applied around the entire perimeter of disc seal 21 between the inner side of rib 29 (at points 35) and the shoulder 33.

This construction thus provides a hermetic seal for the opening 18 — in one step — by simply snapping or press-fitting the seal 21 into place beneath the rib 29, thereby to eliminate the need to provide the conventional metallic retaining ring, the outer layer of epoxy or other similar expedients which were required in the prior art to hold a seal or cover assembly in hermetically sealing engagement with the casing inner wall. The simplicity and ease of this construction, thereby reducing cost, will be readily apparent to those skilled in the art.

The casing 13 can be molded by any conventional molding technique such as compression, injection, or transfer molding. Because the casing can be molded with the rib 29 and shoulder 33, the need to provide additional sealing steps required with metal cans, such as rolling over of the open end of the can, forming a bead in the can wall, or other conventional sealing steps, is eliminated.

Referring again to FIG. 1, one of the most significant problems associated with the kind of disc seal and channel above described is adapting them to rapid assembly practices and the assurances and certainty that a proper tight and non leaking seal is being attained. In prior art capacitors, the channel or groove in which a disc seal fits is usually of a rectangular cross section so that the fit of the disc in the channel is critical as may well be the permissible fit tolerances of both the disc seal and the channel. It is important that the disc seal have an easy snap in fit, and a finished assembly wherein the groove and disc seal cooperatively engage almost automatically in inherently seeking and finding the proper seating and sealing relationship. At the same time, it is highly desirable to have a compression fit of a disc seal in a groove with controlled compression characteristics for discs and cases of wide tolerances.

The foregoing advantages are attained in this invention by means of a groove 32 which has its upper surface defined as a tapering or upwardly sloping surface 36. Preferably this surface 36 tapers upwardly at an angle of from about 45° to 75° with the horizontal. In addition, the outside diameter of disc seal 21 is significantly less than the outside diameter of the channel 32 as shown in FIG. 1 by the space between the side wall of the channel 32 and the edge of disc seal 21. It has been found that the space should be several mils in width for better results. It is also preferable to have the maximum internal projection of rib 29 to be less than the internal diameter of the inner wall 30 of casing 13. This permits easy insertion of the disc seal 21 into casing 13.

It is important that the relationships set out above provide the desired self centering fitting and sealing characteristics. As illustrated in FIG. 1, the periphery of disc seal 21 rests in channel 32 in a special arrangement. More particularly, the disc seal 21 is engaged and compressed between the shoulder or shelf surface 12 and the tapering surface 36. The taper surface is the major contributing factor to the self centering, self fitting, and sealing relationship. For example, the edge of the disc seal should be engaged by the tapered surface somewhere intermediate the length of the tapered surface and at least several mils from the innermost end. Moreover, a preferred combination of an upper tapering surface, of about 45°, and a lower 180° horizontal, shelf, or shoulder surface provides not only a wide area compression of the disc seal 21 but also a more controllable compression. The taper surface in the combination shown may permit the seal to shift slightly and reseal in the event of some slight venting of excess pressure in the casing. However, too much of a taper, i.e., greater than about 75° may not provide a proper seal, and a taper much less than 45° becomes ineffective as an easy snap in fit relationship.

The disc seal and channel of this invention is also advantageous in that the groove configuration permits a greater latitude in thickness tolerances for the disc seal particularly in that thinner and larger disc seals seal equally as well as thicker and smaller disc seals. Furthermore, tolerances in the casing are equally acceptable.

In a preferred embodiment of this invention, the casing 13 is made of a thermosetting plastic moulding technique. In one example the casing 13 must be stripped off a core in a hot state. The taper groove facilitates this stripping process without detriment to the casing 13.

Figure 2:
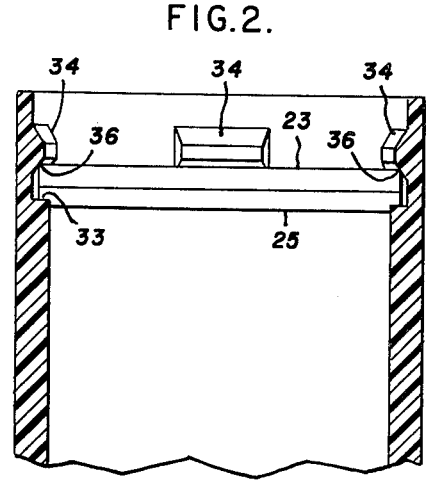
FIG. 2 is an axial section of an electrolytic capacitor casing of another embodiment of this invention.

Referring now to FIG. 2, an alternate construction for the annular rib 29 is shown. This embodiment differs from that shown in FIG. 1 only in the contrasting structures of the rib 34 (FIG. 2) and the rib 29 (FIG. 1). The remaining parts of the capacitor have not been shown in FIG. 2 for clarity in view of the fact that they are identical with that shown in FIG. 1. As will be apparent, the rib must be constructed such that it will provide a fluid-tight compression of the rubber layer 25 against the shoulder 33. Accordingly, it will be clear to those skilled in the art that the rib 34 may be in sections or in any other expedient shape (such as, for example, hemispherical projections) for maintaining compression of the rubber layer.

Figure 3:
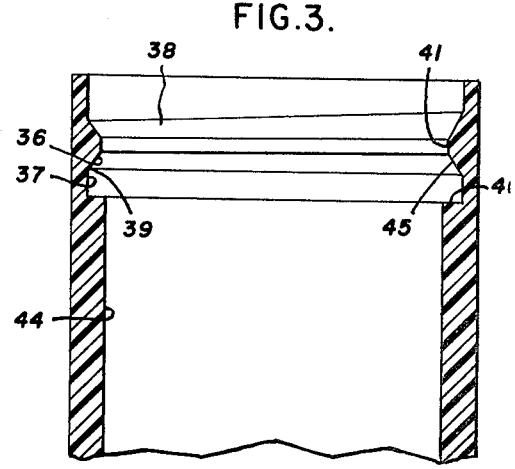
FIG. 3 is an axial section of still another embodiment.

Referring now to FIG. 3, there is shown still another embodiment of this invention which differs from that of FIG. 1 only in the contrasting structures of the ribs 38 (FIG. 3) and the rib 29 (FIG. 1). Again, the remaining parts of the capacitor have not been illustrated in FIG. 3, they being the same as that shown in FIG. 1. The inner casing wall of the embodiment of FIG. 3 is molded to allow a seal positioned therein to be displaced from a hermetic engagement with the wall to allow excess gas pressure to be vented. The venting is provided by forming in an inner casing wall 44 a channel 37 having a gradually varying depth. The length of a rib inner side 45 is linearly increased from a minimum point 39 to a maximum point 41 (180° offset from point 39), while slope of the rib inner side 45 and the channel width remain constant. Accordingly, the channel 37 is dimensioned to provide approximately uniform compressional forces on a seal placed therein, thereby to provide an approximate compression of 30 percent as in the foregoing embodiments. This construction will allow a seal (not shown) of substantially uniform thickness, when positioned in the channel 37, to tip up and out of the channel 37 at the point of minimum depth 39, while it is still retained within the channel 37 at the point 41 of maximum depth. The points 39, 41 of minimum and maximum depth, respectively, are determined by the length of inner side 45. The varying depth construction of channel 37 allows the disc seal 21 to vent excess gas pressure without expelling the entire disc seal 21 and capacitor section 15. Otherwise, the seal and channel structure for this embodiment are preferably constructed as described hereinbefore in reference to FIGS. 1 and 2 except the venting recess (not shown) is now unnecessary and, therefore, omitted.

Figure 4:
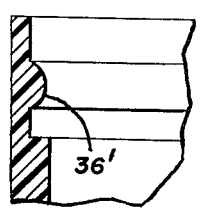
FIG. 4 is an axial section of yet another embodiment of an electrolytic capacitor casing in accordance with this invention.

In FIG. 4, the tapered surface of the channel 37 is defined by a curved or arcuate surface 36' which is preferably outwardly curved as illustrated. The arcuate surface may be defined as part of a circular section whose radius is sufficiently large to provide the function herein described where the disc seal 21 is engaged by an upwardly sloping surface. The term tapering or upwardly sloping is inclusive of such arcuate surfaces.

Although the invention has been described principally with respect to electrolytic capacitors, it will be evident that the seal structure of the invention herein may have application in other electrical devices where maintenance of a strong but simple fluid-tight seal for the container of the electrical device is important.

Further, while the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A sealed capacitor comprising in combination
   a. a cup shaped cylindrical walled casing having an open upper end,
   b. a capacitor section and an electrolyte in said casing,
   c. a transverse circumferential channel inside of said casing and formed in the cylindrical wall of said casing adjacent the open end thereof,
   d. said channel being defined by an inside wall and opposed spaced apart rib and shoulder surfaces,
   e. said rib comprising a transverse circumferential inwardly projecting rib formed in said casing wall to define a tapered surface as the upper wall of said channel,
   f. said surface tapering in an upwardly sloped direction to enlarge the channel entrance,
   g. and a disc seal in said channel to seal said cup and capacitor section therein, said disc seal comprising a disc cover member and an easily compressible seal material at least at its outer periphery on one surface thereof,
   h. the outside diameter of said disc seal being less than the inside diameter of said channel to provide some lateral motion of said disc seal,
   i. said disc seal being positioned in said channel so that compressible seal material rests on said shoulder surface of said channel,
   j. the relative thicknesses of said disc seal and said channel providing sufficient compressibility of said easily compressible material to seal said casing.

2. The invention as recited in claim 1 wherein said tapered surface is planar and has a taper of from about 45° to about 75°.

3. The invention as recited in claim 1 wherein the outside diameter of said disc seal is less than the diameter of the open end of said casing.

4. The invention as recited in claim 3 wherein said casing is a molded thermoset plastic and said disc seal is a laminate of a stiffly flexible non conducting material layer and an elastomeric layer.

* * * * *